United States Patent
Ozawa (10) Patent No.: US 8,363,839 B2
(45) Date of Patent: Jan. 29, 2013

(54) IMAGE FORMING APPARATUS (75) Inventor: Hisashi Ozawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1160 days.

(21) Appl. No.: 12/239,043

(22) Filed: Sep. 26, 2008

(65) Prior Publication Data
US 2009/0086967 A1 Apr. 2, 2009

(30) Foreign Application Priority Data
Sep. 28, 2007 (JP) .................................. 2007-253989

(51) Int. Cl.
H04K 1/00 (2006.01)
H04L 9/00 (2006.01)
H04L 9/28 (2006.01)

(52) U.S. Cl. .............................. 380/277; 380/28; 380/44

(58) Field of Classification Search ................... 380/28, 380/44, 277
See application file for complete search history.

(56) References Cited

U.S. PATENT DOCUMENTS

| 5,623,546 A * | 4/1997 | Hardy et al. .................. 713/193 |
| 2003/0206633 A1 | 11/2003 | Uchino |
| 2006/0031674 A1 * | 2/2006 | Sakurai ......................... 713/166 |
| 2006/0098899 A1 * | 5/2006 | King et al. .................... 382/305 |
| 2007/0130434 A1 * | 6/2007 | Chu et al. ..................... 711/163 |
| 2007/0286496 A1 | 12/2007 | Matsuzaki et al. |
| 2008/0052539 A1 * | 2/2008 | MacMillan et al. .......... 713/193 |
| 2008/0077755 A1 * | 3/2008 | Kitaj et al. ..................... 711/154 |
| 2008/0101596 A1 * | 5/2008 | Cerruti et al. .................. 380/30 |
| 2011/0182419 A1 * | 7/2011 | Coomer .......................... 380/28 |

FOREIGN PATENT DOCUMENTS

| JP | 11-015738 A | 1/1999 |
| JP | 2003-323115 A | 11/2003 |
| JP | 2005-311950 A | 11/2005 |
| JP | 2006-347100 A | 12/2006 |
| WO | 2005112438 A1 | 11/2005 |

* cited by examiner

Primary Examiner — Kambiz Zand
Assistant Examiner — Benjamin Kaplan
(74) Attorney, Agent, or Firm — Panitch Schwarze Belisario & Nadel LLP (57) ABSTRACT An image forming apparatus is supplied capable of preventing an information leakage even if encrypted print data outflows from the image forming apparatus. In the image forming apparatus, a first encryption key storing section stores a first part encryption key generated by a part of an encryption key; a second encryption key storing section stores a second part encryption key generated by other part of the encryption key; an encryption key generating section reads out the second part encryption key when the second encryption key storing section is attached, reads out the first part encryption key, generates the encryption key, and stores it into a volatility memory; an encryption processing section encrypts print information through using the encryption key, and makes encryption print information; a nonvolatility storing section stores the encryption print information; a decryption processing section reads out the encryption print information and the encryption key, and decrypts the print information; and an image forming section forms an image of the decrypted print information.

7 Claims, 10 Drawing Sheets

IMAGE FORMING APPARATUS

BACKGROUND OF THE INVENTION

The invention relates to an image forming apparatus that decrypts print information that is encrypted and stored; and forms an image.

FIELD OF THE INVENTION

Conventionally, in image forming apparatus such as a printer and a copying apparatus, there is a product having a function of authentication print for preventing information from leaking. Such image forming apparatus that has a function of authentication print encrypts print data of authentication print on the basis of an instruction from a host apparatus; and stores it into a nonvolatile memory having a big capacity such as a hard disk (hereinafter: HDD) inside an image forming apparatus. By this, a print name representing the encrypted and stored print data, is displayed on a display scene of a operator panel. User selects the print name representing his/her own encrypted print data though the operator panel; and inputs a password corresponding to the selected print name. The image forming apparatus, in the case that the inputted password agrees with a password of corresponding print name, decrypts the encrypted print data that is stored in HDD for restoring to an original print data and executes a print. By this, even if print data are sent to the image forming apparatus from plural unspecified host apparatuses, because the image forming apparatus executes a printing process with respect to only a particular print data, it is possible to prevent print matter from leaving and to prevent information from leaking. In patent document 1 mentioned below, there is a description that print end data that is stored in HDD of an image forming apparatus, is overwritten by other data in order to prevent information from leaking (refer to patent document 1).

Patent document 1: Japan patent publication No. 2006-347100.

However, such image forming apparatus can prevent information from leaking due to leaving a print matter, but the image forming apparatus cannot prevent encrypted print data that is stored in HDD from leaking. That is, if an encryption key is read out from HDD of the image forming apparatus or memory in the apparatus by an outsider who is malicious, an encryption print data is decrypted, therefore, there is a possibility of leaking information.

SUMMARY OF THE INVENTION

It is, therefore, an object of the invention to provide an image forming apparatus capable of solving the above problem. That is, the image forming apparatus of the present invention can prevent a leaking of stored encryption print data.

An aspect of the invention is to provide an image forming apparatus. The image forming apparatus, comprises a first encryption key storing section that is nonvolatility memory to store a first part encryption key previously generated by a part of an encryption key; a second encryption key storing section that is an attachable and removable nonvolatility memory to store a second part encryption key previously generated by other part of the encryption key, that is different from the first part encryption key; an encryption key generating section that reads out the second part encryption key when the second encryption key storing section is attached, reads out the first part encryption key from the first encryption key storing section, generates the encryption key from the first part encryption key and the second part encryption key, and stores it into a volatility memory; an encryption processing section that encrypts print information through using the encryption key, and makes encryption print information; a nonvolatility storing section that stores the encryption print information; a decryption processing section that reads out the encryption print information from the nonvolatility storing section, reads out the encryption key from the volatility memory, and decrypts the print information; and an image forming section that forms an image of the print information decrypted by the decryption processing section.

Effect of the Present Invention

According to the invention, even if encryption print data that is stored in HDD of the image forming apparatus leaks to the outsider who is malicious, through storing a part of the encryption key into an attachable and removable storing section that serves as the portable storing section, because it is difficult for the outsider to decrypt the encrypted print data as long as user holds the portable storing section, it is possible to prevent information from leaking.

The above and other objects and features of the present invention will become apparent from the following detailed description and the appended claims with reference to the accompanying drawings.

DETAILED DESCRIPTION OF THE PREFERRED EMBODIMENTS

The following is to explain embodiment of the present invention through using drawings.

Embodiment 1

Figure 1:
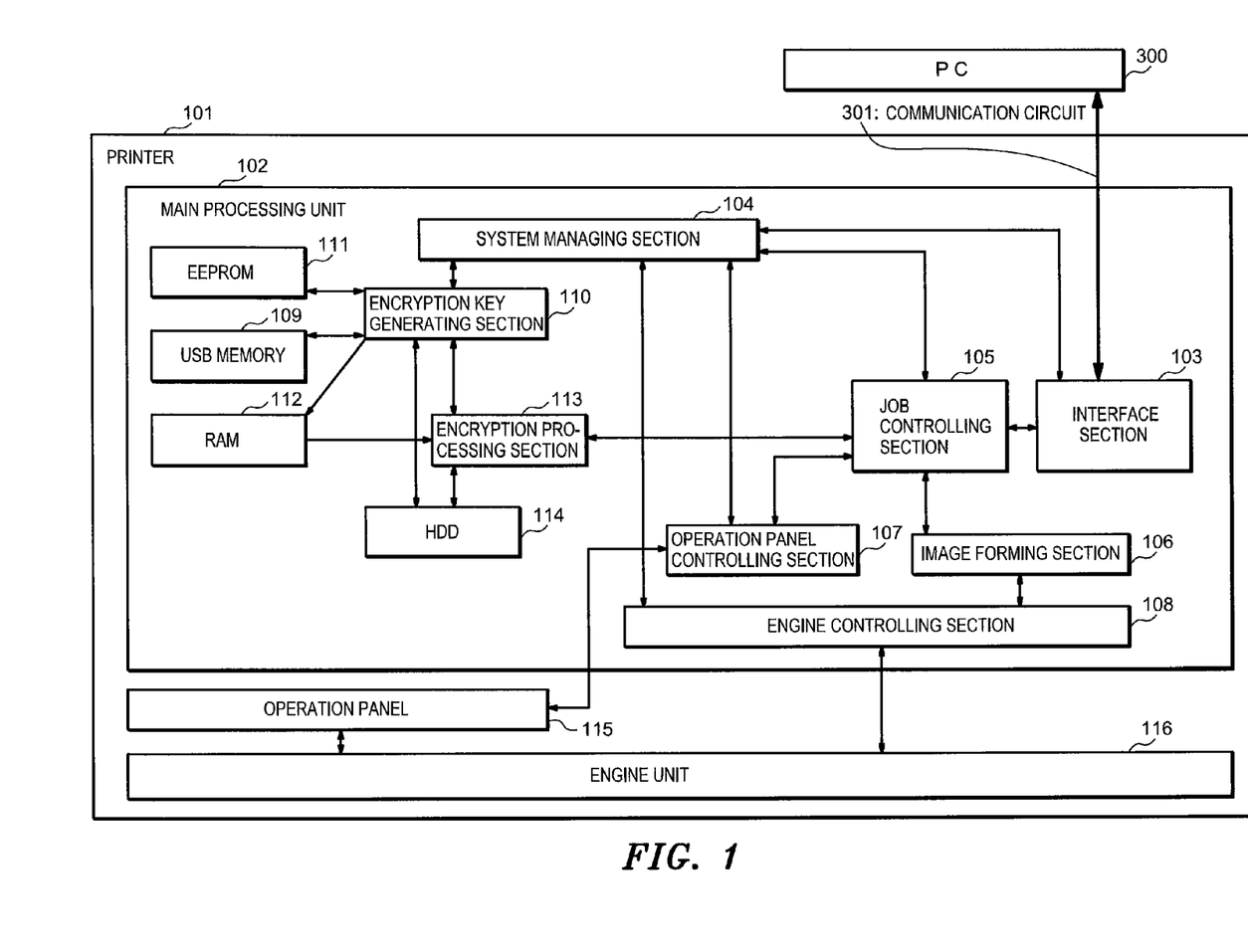
FIG. 1 is a block diagram of a printer in embodiment 1.

FIG. 1 is a block diagram of a printer in embodiment 1.

The embodiment 1 is explained to adopt a printer 101 as an image forming apparatus and to adopt a personal computer 300 (hereinbelow: PC 300) as an information processing apparatus.

The printer 101 and the PC 300 are connected with each other via a communication circuit 301. The PC 300 sends state confirmation data to the printer 101 via communication circuit 301. The state confirmation data is used for that the PC 300 confirms a state of the printer 101, for example, whether power source is turned on or off in the printer 101, whether or not the printer 101 and the PC 300 are in a communicate possible state, whether or not ink or toner of the printer 101 lacks, and whether or not the printer 101 stops due to a paper jam or the like.

The printer 101, after received the state confirmation data, immediately sends a state of the printer 101 to the PC 300. The PC 300 judges the state of the printer 101, if there is no problem, sends print data to the printer 101. The printer 101 performs a printing process according to the received print data. In the case that user executes an authentication print, the printer 101 executes an encryption and stores the print data into a HDD 114 of the printer 101.

Next, regarding an internal construction of the printer 101, it will be explained. The printer 101 is formed from a main processing unit 102, an engine unit 116 and an operation panel 115.

The main processing unit 102 is formed from an interface section 103, a job controlling section 105, an image forming section 106, an operation panel controlling section 107, an engine controlling section 108, a system managing section 104, a USB memory 109, an encryption key generating section 110, an EEPROM 111, a RAM 112, an encryption processing section 113 and the HDD 114.

Here, regarding an encryption, it will be explained.

In a method of the encryption, according to a roughly classification, a common key encryption method in which an encryption key and a decryption key are set to the same key and a publication key encryption method in which an encryption key and a decryption key are set to be different from each other.

The present invention adopts the common key encryption method. On the one hand, a rule for replacement of data arrangement is set in advance, and the rule is executed by an encryption key. On the other hand, a decryption is executed to restore the encrypted data whose bit string arrangement is replaced on the basis of the rule and the encryption key according to a reverse order. If many rules are prepared, the encrypted data becomes difficult to decode by outsider. In the present invention, the encryption key is set to 16 hexadecimal number of 10 figures. Because it is equal to a binary number of 40 bits, then, for example, in the case to set 40 different rules, it is possible to obtain 40 kinds of arrangements of 40 bits of the encryption key. Such process is called "permutation process" of encryption technique. In the encryption technique, except the "permutation process", there is a technique of "substitution process" that previously prepares plural replacement tables of data, selects a replacement table to be used according to the encryption key, and replaces the bit line of the original data. Further, an encryption that performs an arrangement of the original data by "XOR (exclusive logical disjunction)", is also used frequently. In the case that XOR is used, it is possible to execute an arrangement of the original data per 40 bits through using 40 bits of an encryption key.

Moreover, in the present invention, it is not limited by a process method of arrangement replacement of bit string, and it is to aim a structure in which an encryption key used in encryption and decryption in a common key encryption method is not decoded.

Regarding the USB memory 109, the encryption key generating section 110, the EEPROM 111, the RAM 112, the encryption processing section 113 and the HDD 114 that are main part of the present invention, they will be explained.

The USB memory 109 is attachable and removable with respect to the printer 101. The USB memory 109 has an inside nonvolatility memory such as Flash memory, and performs a communication with the printer 101 through using Universal Serial Bus interface.

In the present invention, the USB memory 109 in which the encryption key formed from data of 10 figures is previously stored, is used. That is, through combining with the HDD 114, such USB memory 109 is used for encrypting data and storing encrypted data into the HDD 114; and decrypting the encrypted data and reading out it.

Further, an encryption key which is set by manufacturing company, is previously stored in such USB memory 109. Moreover, as mentioned below, the USB memory 109 is managed by administrator of printer.

In the case that such USB memory is firstly attached to apparatus, the encryption key generating section 110, as an initialization operation, reads out the encryption key from the USB memory 109; divides the encryption key into two encryption key; and generates one key as a first encryption key and generates the other key as a second encryption key. Further, the encryption key generating section 110 makes the EEPROM 111 store the first encryption key; and makes the USB memory 109 store the second encryption key. Then, the administrator manages the USB memory 109 which stores the second encryption key. Moreover, the encryption key generating section 110 also makes the USB memory 109 store a serial number of the printer 101 for distinguishing the printer 101, and a serial number of the HDD 114.

Further, in the case that the administrator attaches the USB memory 109 in order to make the printer perform an encryption process after the encryption key generating section 110 generated and stored the first and the second encryption keys, the encryption key generating section 110 reads out the first encryption key and the second encryption key from the EEPROM 111 and the USB memory 109 respectively; restores the encryption key; and stores it into the RAM 112.

The EEPROM 111 is a nonvolatile memory which is mounted on substrate inside the printer 101; and stores sheet number data used for abstracting exchange timing of a toner cartridge of the printer 101, and backup data regarding a language setting when shipment and the like, together with the first encryption key.

The RAM 112 is a volatile memory inside the printer 101; and deletes an encryption key which is restored by turning off the switch.

The encryption processing section 113 encrypts print data that is sent by the job controlling section 105 through using an encryption key which is read from the RAM 112; and stores the encrypted print data into the HDD 114.

Further, the encryption processing section 113, in the case that a print demand of the encrypted print data is received from the job controlling section 105, reads out the encrypted print data corresponding to the print demand from the HDD 114; decrypts it through using an encryption key which is restored by the RAM 112; and sends the decrypted print data to the job controlling section 105.

The HDD 114 is a nonvolatile memory having big capacity, which is mounted with the printer 101. The HDD 114 is mounted inside the printer 101.

The interface section 103 is a part that sends and receives data with the PC 300, and is connected with the PC 300 via the communication circuit 301. Further, the interface section 103 receives state confirmation data and print data from the PC 300 via the circuit. Further, the interface section 103, after received the state confirmation data, obtains a state information of the printer 101 from the connected system managing section 104; and gives a reply to the PC 300. Furthermore, the interface section 103 is also connected with the job controlling section 105, and sends the print data that is received from the PC 300 to the job controlling section 105.

The system managing section 104 is a part to manage state of the printer 101, system information and various setting value information. Further, the system managing section 104 is connected with the interface section 103, the job controlling section 105, the operation panel controlling section 107, the engine controlling section 108 and the encryption key generating section 110. Further, the system managing section 104 has a function to notify each connected section of information, and to perform an instruction of process with respect to each section. Furthermore, the system managing section 104, when received a communication of abnormality from the connected each section, performs a communication of abnormality, an instruction to stop a process, an instruction to restart a process or an instruction to cancel a process with respect to each section. In the case, the system managing section 104 instructs the operation panel controlling section 107 to display an abnormal state of the printer 101.

The job controlling section 105 is a part that judges whether it is "authentication" or "non-authentication"; decides a sending destination of the print data that is received from the interface section 103; and sends it. For example, on the one hand, the job controlling section 105, in the case that performs a non-authentication print, sends the print data to the image forming section 106. On the other hand, the job controlling section 105, in the case that performs an authentication print, sends the print data to the encryption processing section 113. The print data is encrypted by the encryption processing section 113; and is stored into the HDD 114.

The image forming section 106 is a part that edits the print data received from the job controlling section 105; makes middle data; and expands the middle data for making raster data. The raster data is a kind of image data, and is formed from location information and numerical value information. The made raster data is sent to the engine controlling section 108.

The engine controlling section 108 is a part that sends the raster data that is received from the image forming section 106 to the engine unit 116; and performs a print control. Further, the engine controlling section 108 is also connected with the system managing section 104, in the case that an abnormal state occurs such as a paper jam or a spending of toner, the engine controlling section 108 directly sends state information of abnormality to the system managing section 104.

The engine unit 116 has a function to print the raster data that is received from the engine controlling section 108. Further, the engine unit 116 is also connected with the operation panel 115; and make the operation panel 115 display a print condition.

The operation panel controlling section 107 is connected with the job controlling section 105. Further, the operation panel controlling section 107 is a part to control a display of the state information received from the job controlling section 105.

The operation panel 115 is connected with the operation panel controlling section 107. Further, the operation panel 115 is a part that performs a display information that is received from the operation panel controlling section 107; and receives an operation input from external. Further, the operation panel 115 is formed from a panel which displays various operation information, setting information and guidance information; and which is formed from a LCD (Liquid Crystal Display) or the like, respective operation buttons, a touch panel which is unified with the LCD, or the like. Furthermore, the operation panel 115 also has an operating section which receives operation by user.

An operation of the printer mentioned above, will be explained.

Figure 2:
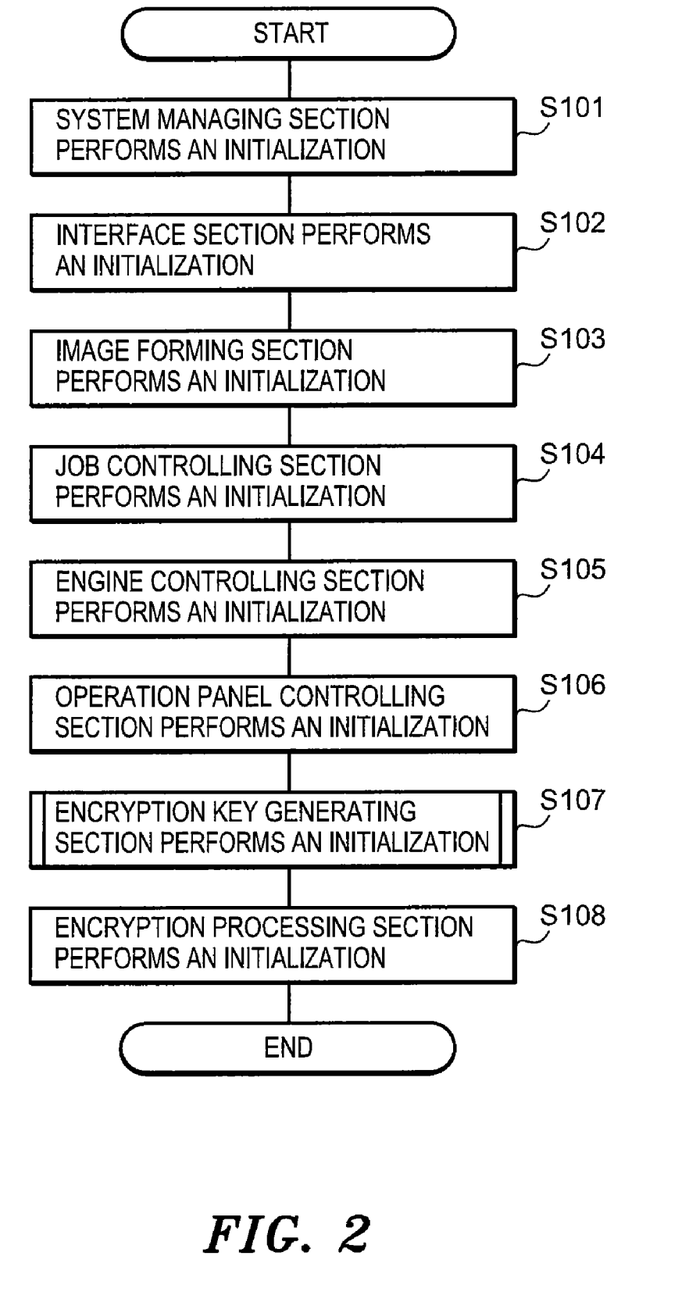
FIG. 2 is a flowchart for explaining an initialization of embodiment 1.

FIG. 2 is a flowchart for explaining an initialization of embodiment 1.

Regarding the initialization of the printer 101, it will be explained from step S101 to step S108 according to the step order. In the present invention, the administrator of the printer firstly attaches the USB memory 101 and performs a setting of the first encryption key with respect to the printer 101 when initializing.

Step S101

The system managing section 104 performs an initialization. That is, the system managing section 104, as an initialization of the whole system, just after power source turned on, performs a reading of setting information and state information regarding each section.

Step S102

The interface section 103 performs an initialization. That is, the interface section 103 performs a confirmation of connection with the PC 300; confirms whether or not it is possible to communicate with the PC 300; and sends a conformation result to the system managing section 104.

Step S103

The image forming section 106 performs an initialization. That is, the image forming section 106 sends information representing whether or not it is possible to communicate to the job controlling section 105.

Step S104

The job controlling section 105 performs an initialization. That is, the controlling section 105 confirms the initialization of the image forming section 106 and the initialization of the encryption processing section 113; and sends a confirmation result to the system managing section 104.

Step S105

The engine controlling section 108 performs an initialization; and outputs an instruction to initialize to the engine unit 116. Further, the engine controlling section 108 confirms state information of the engine unit 116; performs a stoppage on the way to operating or makes the engine unit 116 initialize when the engine unit 116 is not at initial location. The engine unit 116 performs an initialization operation; and sends information representing whether or not it is possible to print to the system managing section 104.

Step S106

The operation panel controlling section 107 performs an initialization; and outputs an instruction to initialize to the operation panel 115. The operation panel 115 displays a menu scene and displays information representing whether or not it is possible to print for user.

Step S107

The encryption key generating section 110 performs an initialization.

Step S108

Finally, the encryption processing section 113 performs an initialization; and make the HDD 114 initialize.

Next, regarding an initialization operation of the encryption key generating section 110, it will be explained in detail.

Figure 3:
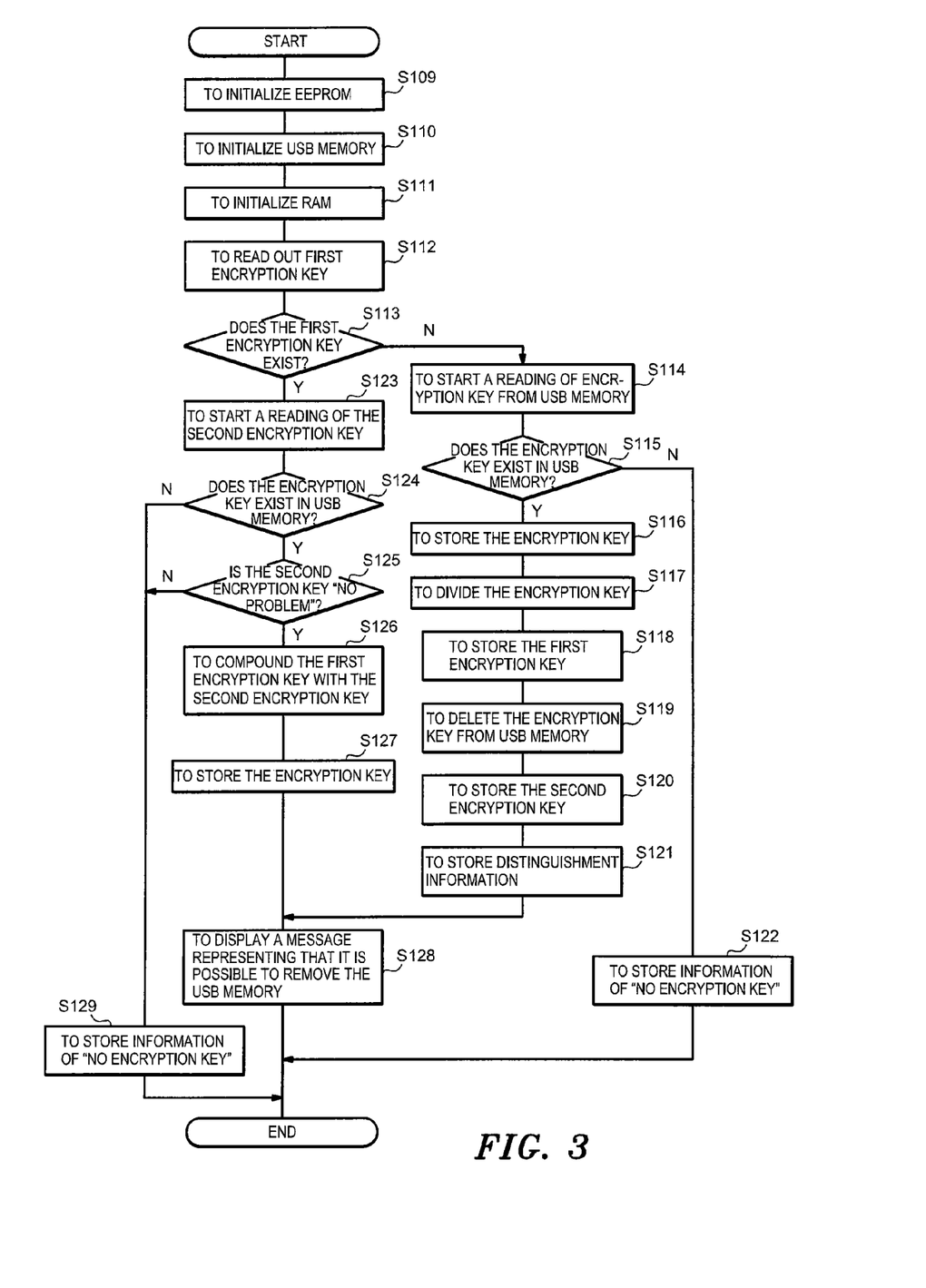
FIG. 3 is a flowchart for explaining an initialization operation of an encryption key generating section in embodiment 1.

FIG. 3 is a flowchart for explaining an initialization operation of an encryption key generating section in embodiment 1.

Before the flowchart shown by FIG. 3 is explained, regarding a relation to each encryption key and state change of each storing section, they will be explained.

Figure 4A:
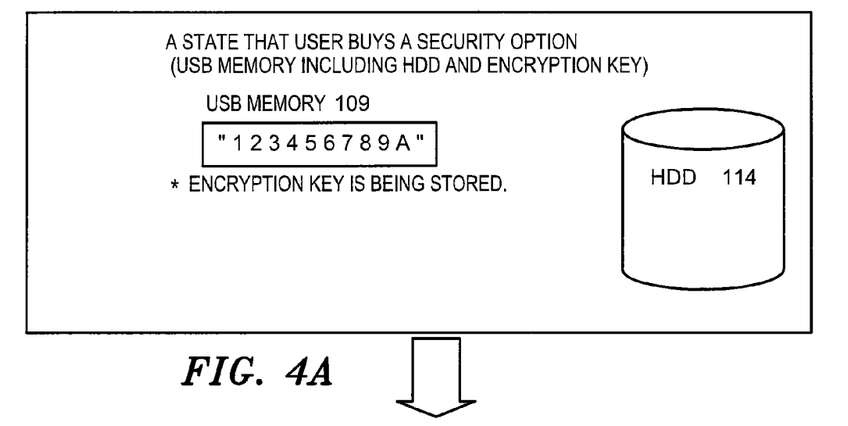
FIG. 4A is a first explanatory diagram of an encryption key in embodiment 1.
Figure 4B:
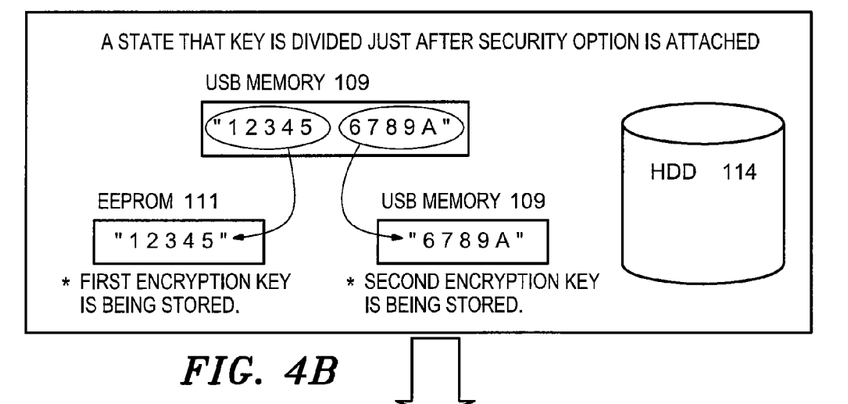
FIG. 4B is a second explanatory diagram of an encryption key in embodiment 1.

FIG. 4A is a first explanatory diagram of an encryption key in embodiment 1; FIG. 4B is a second explanatory diagram of an encryption key in embodiment 1; and FIG. 4C is a third explanatory diagram of an encryption key in embodiment 1.

FIG. 4A represents encryption key that is stored into the HDD 114 and the USB memory 109. As shown by FIG. 4A, originally, data of 16 hexadecimal number of 10 figures "123456789A" serving as encryption key, is stored in the USB memory 109.

FIG. 4B represents a state that encryption key is divided in the case that the USB memory 109 is firstly attached. After power source is turned on in the printer 101, the encryption key generating section 110 divides the encryption key into two keys; generates a first encryption key "12345" and a second encryption key "6789A"; stores the first encryption key into the EEPROM 111; and stores the second encryption key into the USB memory 109.

Figure 4C:
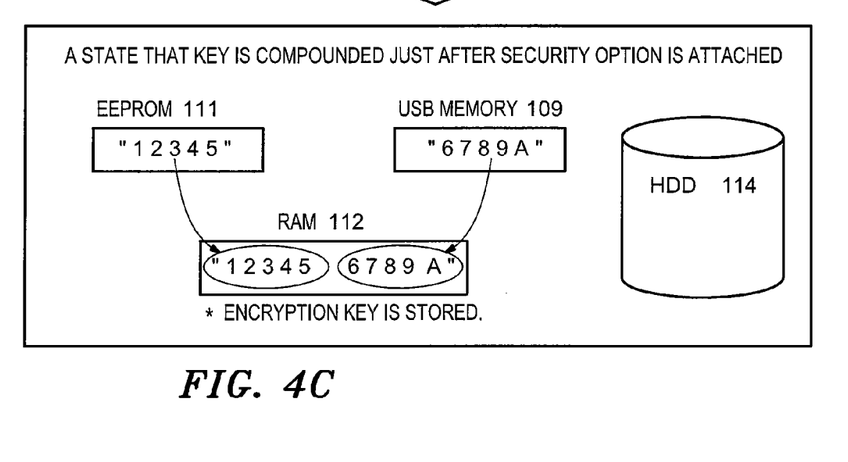
FIG. 4C is a third explanatory diagram of an encryption key in embodiment 1.

FIG. 4C represents a state that the USB memory 109 is attached and the encryption key is restored by the encryption key generating section 110 in order to perform an encryption process afterward. The encryption key generating section 110 restores the encryption key "123456789A" from the first encryption key "12345" and the second encryption key "6789A" which is obtained from the USB memory 109; and stores it into the RAM 112.

Next, regarding an initialization operation of an encryption key generating section, it will be explained from step S109 to step S128 through using the flowchart shown by FIG. 3 according to the step order.

Step S109

The encryption key generating section 110 performs an initialization of access means with respect to the EEPROM 111; and sets the EEPROM 111 to a standby state.

Step S110

The encryption key generating section 110 performs an initialization of access means with respect to the USB memory 109. By the initialization, it is judged whether or not the USB memory 109 is attached to the printer 101, if the USB memory 109 is attached, the encryption key generating section 110 sets the USB memory 109 to a standby state.

Step S111

Next, the encryption key generating section 110 performs an initialization of access means with respect to the RAM 112. Further, the encryption key generating section 110 clears data of RAM just after power source is turned on; and sets the RAM 112 to a standby state.

Step S112

After the initialization of access means of each section is completed, the encryption key generating section 110 starts a reading of the first encryption key from the EEPROM 111.

Step S113

The encryption key generating section 110 judges whether the read first encryption key is normal or abnormal. In the case that it is normal, the step S123 is started; in the case that it is abnormal, the step S114 is started. The judgment is performed by judging whether a value that is read in the step S112 is an initial value (for example, "00000") or not. In the case that the judgment result is the initial value, the encryption key generating section 110 judges that there is no first encryption key. That is, it represents that encryption is not put in the printer 101.

Step S114

The encryption key generating section 110 starts a reading of the encryption key from the USB memory 109.

Step S115

If the USB memory 109 is attached, the encryption key generating section 110 reads the encryption key "123456789A" which is shown by FIG. 4A, and the flow is shifted to the step S116; if the USB memory 109 is not attached, the step S122 is started.

Step S116

The encryption key generating section 110 temporarily stores the encryption key which is read in the step S115 into the RAM 112.

Step S117

The encryption key generating section 110, as shown by FIG. 4B, divides the encryption key which is read in the step S115 into the front 5 figures and the back 5 figures.

Step S118

The encryption key generating section 110, as shown by FIG. 4B, stores the front 5 figures of the encryption key into the EEPROM 111 as first encryption key.

Step S119

The encryption key generating section 110 deletes the encryption key of 10 figures "123456789A" which is originally stored in the USB memory 109.

Step S120

The encryption key generating section 110, as shown by FIG. 4B, stores the back 5 figures of the encryption key which is divided in the step S117 into the USB memory 109 as second encryption key. The USB memory 109 is administered and held by administrator.

Step S121

The encryption key generating section 110 obtains a serial number of the printer 101 from the system managing section 104 and obtains a serial number of HDD from the HDD 114 in order to distinguish the printer 101 in which encryption function is put. Further, the encryption key generating section 110 stores the obtained respective serial numbers into the USB memory 109 as distinguishment information.

Step S122

The encryption key generating section 110 stores information of "no encryption key" into the RAM 112, and the process is finished.

Step S123

In the case that the first encryption key is not initial value in the step 113, it is judged that the printer 101 is already set the first encryption key, the encryption key generating section 110 starts a reading of the second encryption key from the USB memory 109 in order to execute an encryption process.

Step S124

The encryption key generating section 110 reads the second encryption key "6789A" shown by FIG. 4B from the USB memory 109, then, the step S125 is started; in the case that an improper USB memory in which the second encryption key is not stored is attached, the step S129 is started.

Step S125

Continually, the encryption key generating section 110 obtains the serial number of the printer 101 from the system managing section 104; obtains the serial number of HDD from the HDD 114; compares them with the distinguishment information that is stored in the USB memory 109; and judges whether or not they agree. If they agree, the step S126 is started; if they disagree, the step S129 is started.

Step S126

The encryption key generating section 110, as shown by FIG. 4C, compounds the first encryption key with the second encryption key; and restores the encryption key.

Step S127

The encryption key generating section 110 stores the encryption key which is restored in the step S126 into the RAM 112. By this, an encryption process of print data becomes possible.

Step S128

The encryption key generating section 110 notifies the system managing section 104 of a completion of the initialization of the encryption key generating section 110. The system managing section 104 instructs the operation panel controlling section 107 to display a message that it is possible to remove the USB memory (for example, "Please remove the USB memory and keep it in safe place") on the operation panel 115. By this, the initialization of the encryption key generating section 110 is completed.

Step S129

In the case that the second encryption key is not stored in the USB memory 109 in the step S124, or in the case that the distinguishment information that is stored in the USB memory 109, is different in the step S125, information of "no encryption key" is stored into the RAM 112, and the initialization is completed.

The above explains about the initialization of the encryption key generating section 110.

Next, regarding an operation of an authentication print, it will be explained. First of all, regarding a formation of print data, it will be explained.

Figure 5:
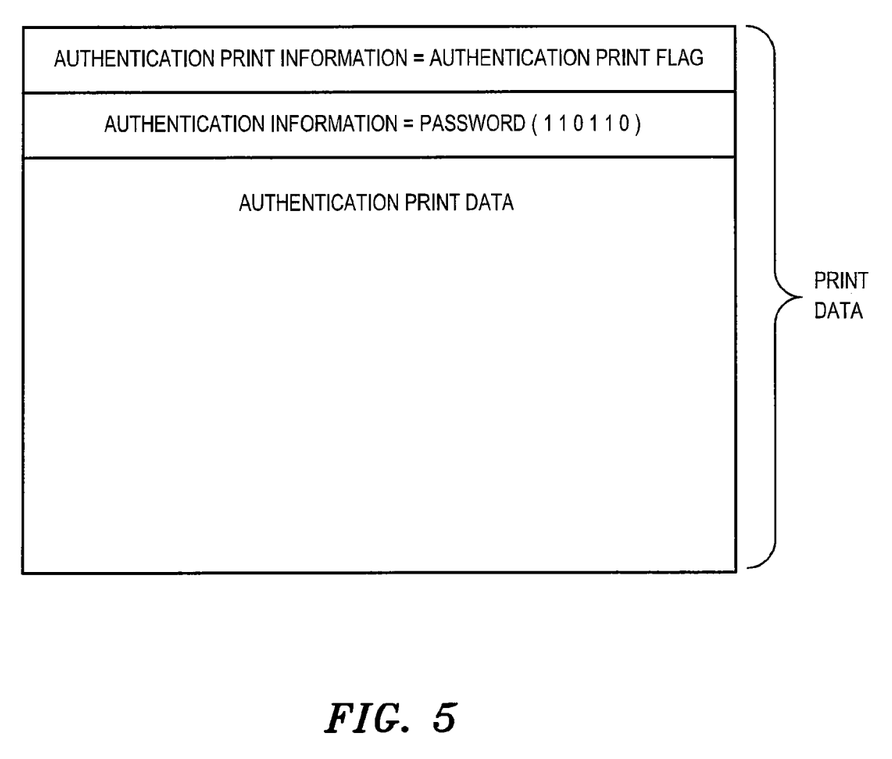
FIG. 5 is a print data formation diagram of authentication print in embodiment 1.

FIG. 5 is a print data formation diagram of authentication print in embodiment 1.

As shown by FIG. 5, print data that designates an authentication print is formed from three blocks, that is, "authentication print flag", "password of authentication information 110110" and "authentication print data".

Figure 6:
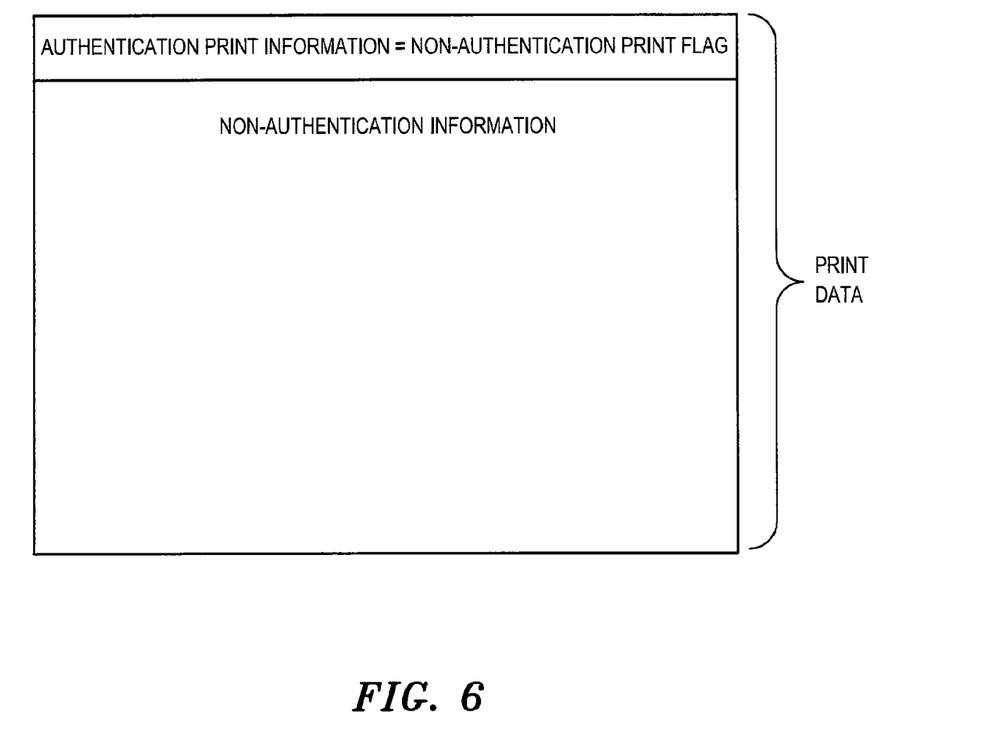
FIG. 6 is a print data formation diagram of non-authentication print in embodiment 1.

FIG. 6 is a print data formation diagram of non-authentication print in embodiment 1.

As shown by FIG. 6, print data that designates a non-authentication print is formed from "non-authentication print flag" and "non-authentication print data".

Figure 7:
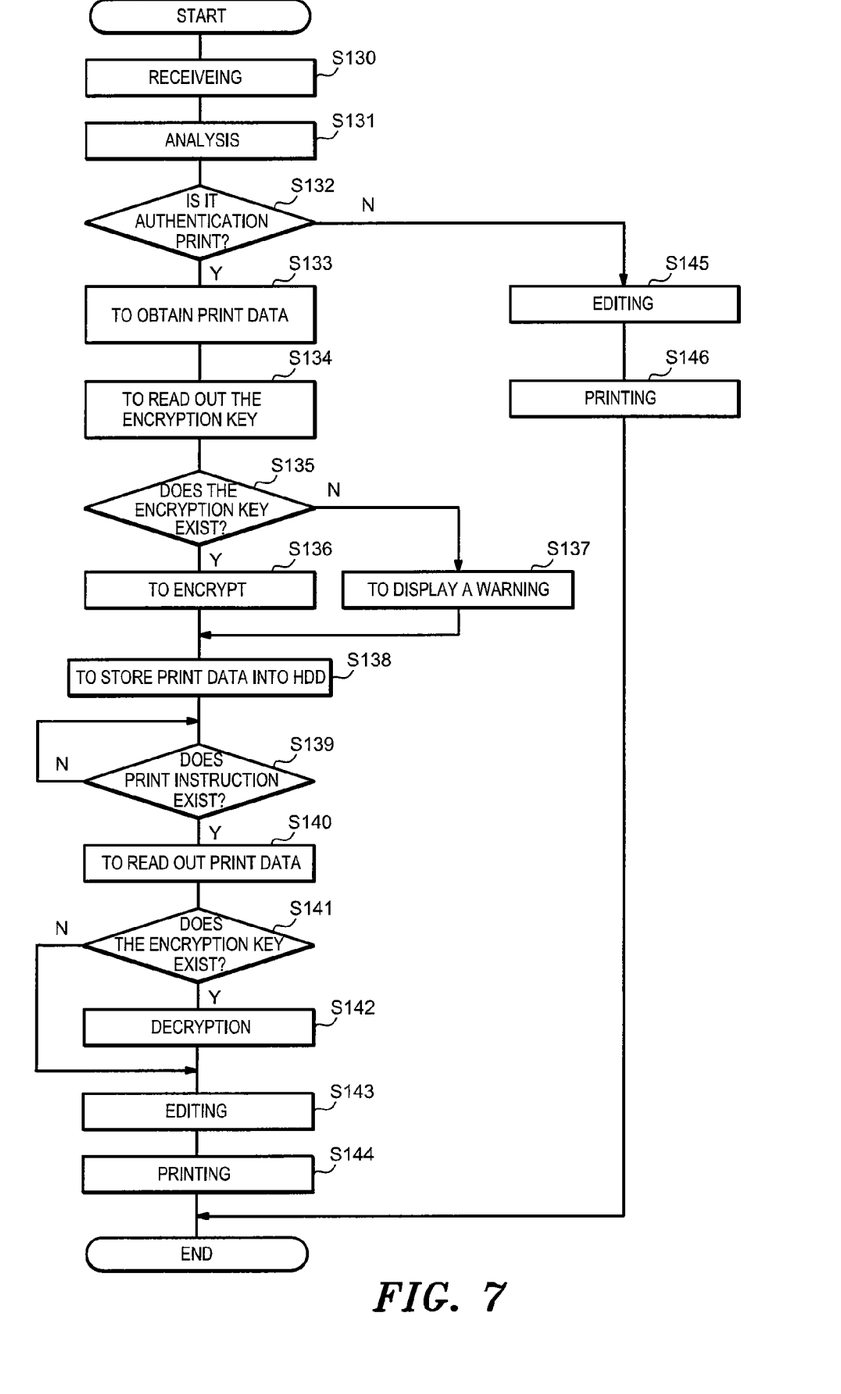
FIG. 7 is a flowchart for explaining a process of authentication print in embodiment 1.

FIG. 7 is a flowchart for explaining a process of authentication print in embodiment 1.

Regarding the flow of authentication print process, it will be explained from step S130 to step S146 through using the flowchart shown by FIG. 7 according to the step order. In the process of authentication print, an encryption of print data is executed.

Step S130

The interface section 103 receives print data that designates an authentication print or print data of a non-authentication print from the PC 300 via communication circuit 301.

Step S131

The interface section 103 sends the print data that is received in the step S130 to the job controlling section 105. The job controlling section 105 judges whether the sent print data is authentication print or non-authentication print through using flag of the print data shown by FIG. 5 and FIG. 6.

Step S132

In the case that the job controlling section 105 judges the print is authentication print, the step S133 is started; in the case that it judges the print is not authentication print, the step S145 is started.

Step S133

The job controlling section 105 sends the print data that is received from the interface section 103 to the encryption processing section 113 in order to store encryption print data into the HDD 114.

Step S134

The encryption processing section 113 reads out the encryption key which is stored when initializing from the RAM 112.

Step S135

In the case that the encryption key can be read out, the step S136 is started; in the case that the encryption key cannot be read out, the step S137 is started.

Step S136

The encryption processing section 113 encrypts the authentication print data that is obtained in the step S133 through using the encryption key which is read out in the step S134, then, the step S138 is started.

Step S137

Because the restored encryption key of the RAM 112 is improper, the encryption processing section 113 notifies the job controlling section 105 that stores print data into the HDD 114 without executing an encryption. The job controlling section 105 makes the operation panel 115 display a warning of "The print data has been stored without executing the encryption" though the operation panel controlling section 107. Further, the job controlling section 105 notifies the PC 300 of a warning of "The print data has been stored without executing the encryption" though the interface section 103 and the communication circuit 1001, and the step S138 is started without executing the encryption.

Step S138

The print data is stored in HDD 114.

Step S139

The printer 101 waits until the user inputs a password of authentication print. After the user selected an authentication print menu though operating the operation panel 115; selected an authentication job; and inputted a password of the authentication job, the system managing section 104 of the printer 101 judges whether or not the password is correct, if the password is correct, the job controlling section 105 instructs the encryption processing section 113 to read print data.

Step S140

The job controlling section 105 instructs the encryption processing section 113 to read the print data, and the encryption processing section 113 reads out corresponding print data from the HDD 114.

Step S141

The encryption processing section 113 judges again whether or not the encryption key exists in order to judge whether or not the corresponding print data is encrypted for executing a print, in the case that the encryption key exists, the step S142 is started; in the case that the normal encryption key does not exist, the step S143 is started.

Step S142

The encryption processing section 113 decrypts the corresponding print data.

Step S143

The job controlling section 105 sends the print data to the image forming section 106. The image forming section 106 expands and edits the received print data to generate raster data.

Step S144

The image forming section 106 sends the raster data to the engine controlling section 108. The engine controlling section 108 sends the received raster data to the engine unit 116. Then, the engine unit 116 executes a print and the flow is finished.

Step S145

Because the judgment result in the step S132 is the case of non-authentication print, the job controlling section 105 sends the print data that is received from the interface section 103 to the image forming section 106. The image forming section 106 edits and expands the print data; and generates a raster data in order to print.

Step S146

The image forming section 106 sends the raster data that is generated in the step S145 to the engine controlling section 108. The engine controlling section 108 sends the received raster data to the engine unit 116. The engine unit 116 executes a print, and then, the flow is finished.

According to the above, in the embodiment 1, in the printer 101 having the encryption function, through calculating the encryption key to divide it into two keys, and respectively storing the two keys into the nonvolatile memory which is furnished in the apparatus and into the attachable and removable memory, the attachable and removable memory is separately kept from the printer 101, and the restoration encryption key (RAM) that is used for the encryption process is deleted. Further, the first encryption key is stored in the nonvolatile memory, therefore, even if the encrypted print data leaks to outsider, if only the attachable and removable memory is managed certainly, the decryption of the print data is difficult for outsider, so it is possible to prevent the information leakage.

Embodiment 2

Next, regarding a structure of embodiment 2, it will be explained.

Figure 8:
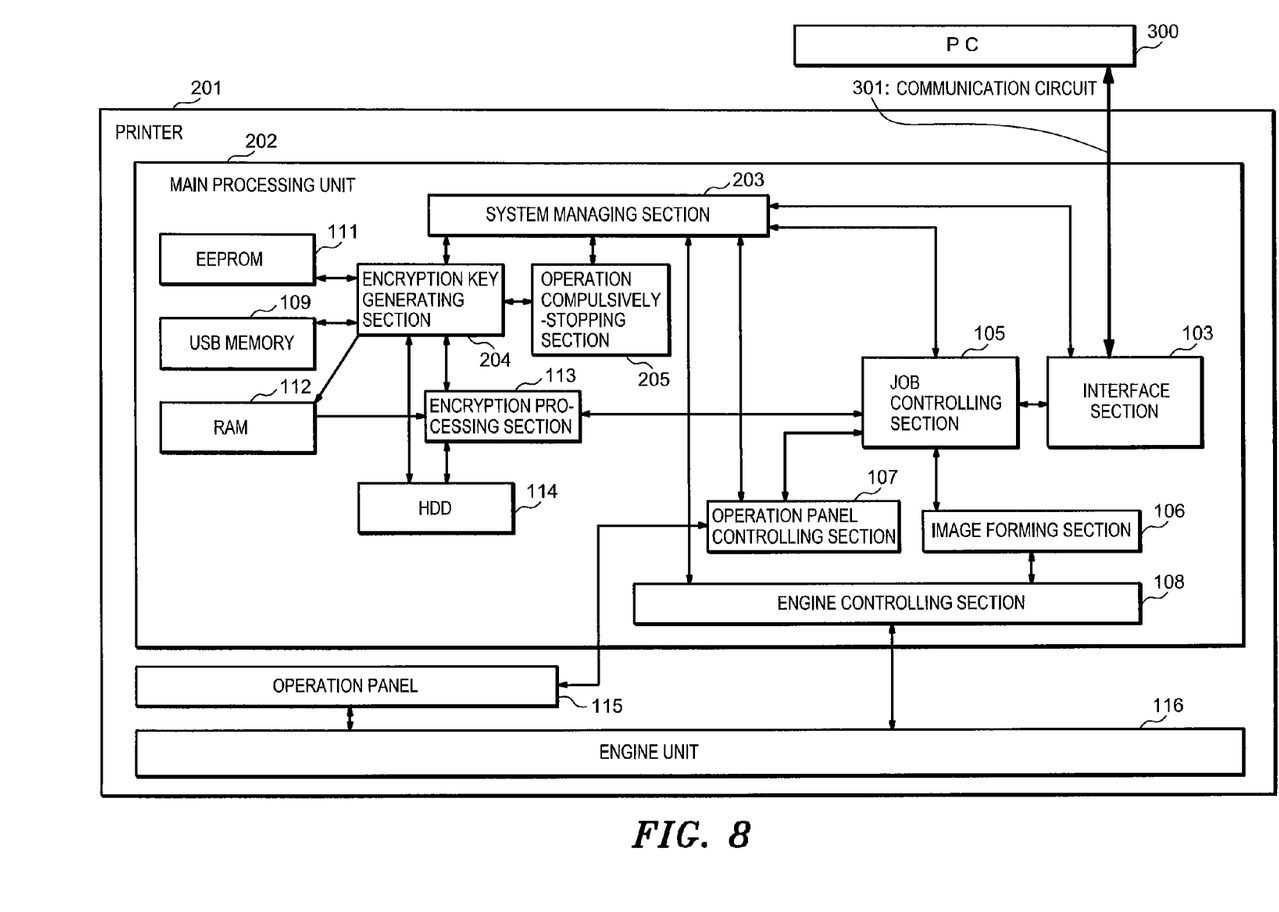
FIG. 8 is a block diagram of a printer in embodiment 2.

FIG. 8 is a block diagram of a printer in embodiment 2.

A printer 201 in embodiment 2 has a structure that a main processing unit 202 includes an operation compulsively-stopping section 205, the structure is different from that of the embodiment 1. Moreover, in the embodiment 2, regarding the same components as the embodiment 1, they are assigned the same symbols and their detailed explanations are omitted.

The operation compulsively-stopping section 205 is connected with an encryption key generating section 204. Further, the operation compulsively-stopping section 205 is a part to stop the printer 201 in the case the encryption key generating section 204 is a USB memory held by an improper outsider except the administrator when it is initialized. That is, the operation compulsively-stopping section 205 is also connected with a system managing section 203, if the USB memory is improper, the operation compulsively-stopping section 205 requests the system managing section 203 to stop an operation of the printer 201. The system managing section 203 informs the connected each section of a cancel of the process to stop the operation of the printer 201.

Next, regarding an operation of the embodiment 2, it will be explained.

Figure 9:
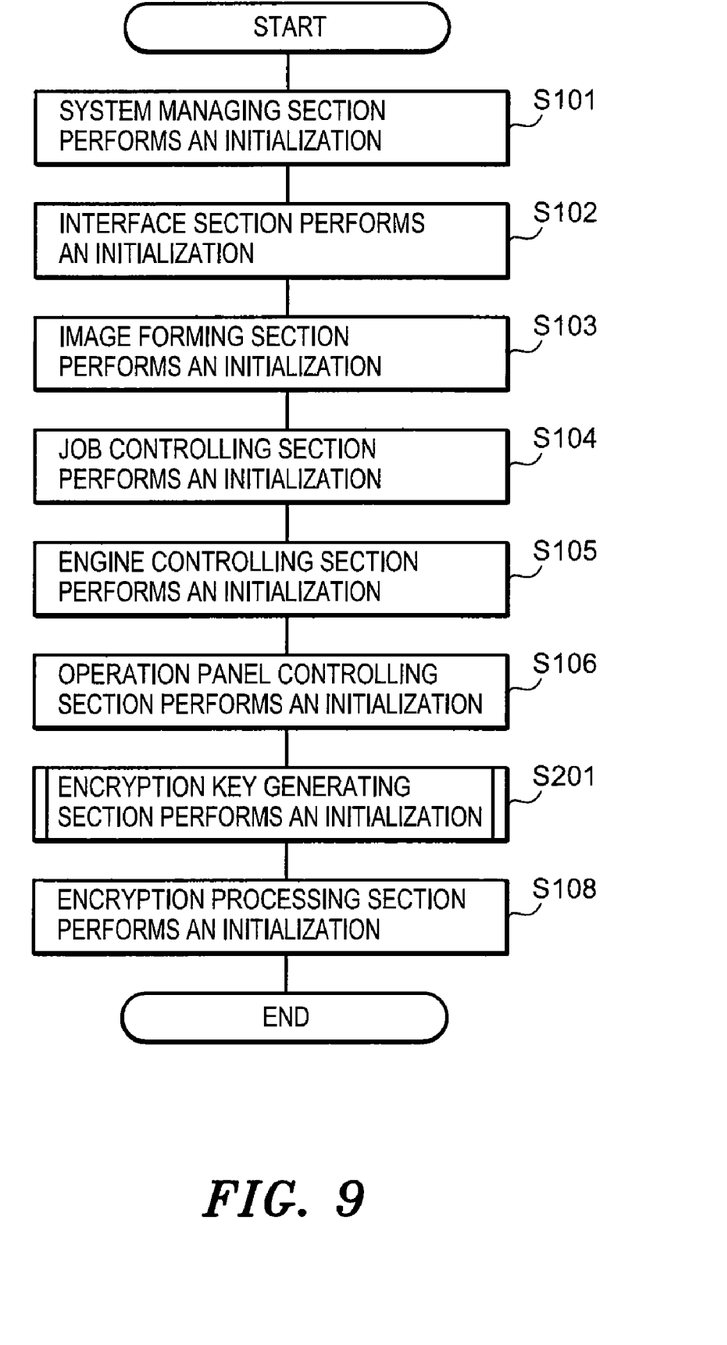
FIG. 9 is a flowchart for explaining an initialization of embodiment 2.

FIG. 9 is a flowchart for explaining an initialization of embodiment 2.

The operation of the initialization of embodiment 2 is different from that of the embodiment 1 in the part of "initialization of the encryption key generating section 204" shown by the step S201 in the FIG. 9. Accordingly, next, it will be explained in detail about a process of "initialization of the encryption key generating section 204".

Figure 10:
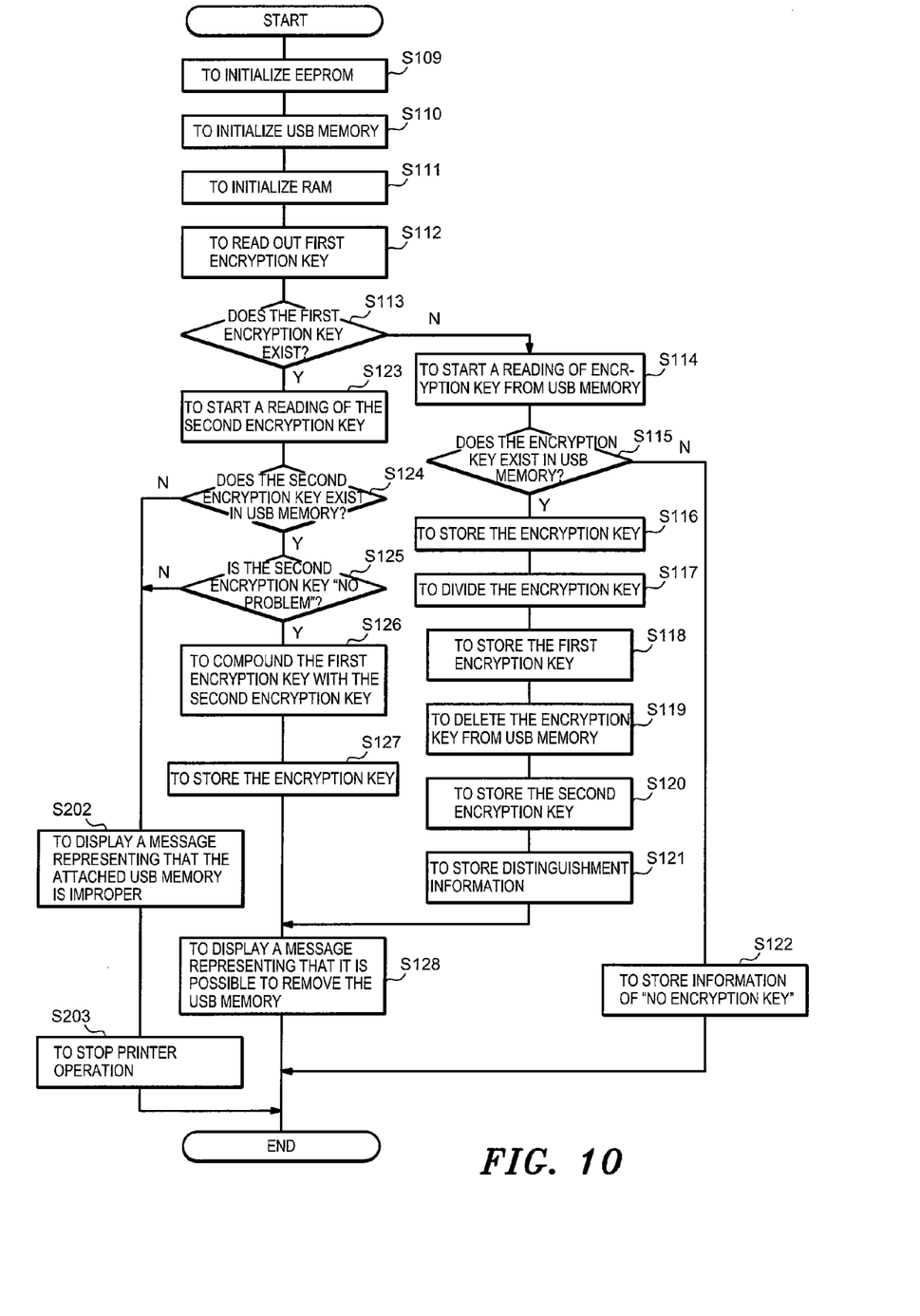
FIG. 10 is a flowchart for explaining initialization of an encryption key generating section in embodiment 2.

FIG. 10 is a flowchart for explaining initialization of an encryption key generating section 204 in embodiment 2.

In the FIG. 10, the same processes as the embodiment 1 (FIG. 3) are assigned the same symbols, therefore, their detailed explanations are omitted. In the embodiment 2, the process when the desired USB memory 109 is not attached to the printer 201 in the step S124 and the step S125, is different from that of the embodiment 1.

The step S124 is a process in the case that the second encryption key is not stored in the USB memory 109; and the step S125 is a process in the case that the second encryption key is improper. In the both cases, the operation compulsively-stopping section 205 requests the system managing section 203 to stop operation in order to stop the operation of the printer 201. Next, it will be explained from the step S202 to the step S203.

Step S202

In the case that the desired USB memory 109 is not attached to the printer 201 in the step S124 and the step S125, the system managing section 203 makes the operation panel 115 display a message of "Because a USB memory is not attached or a USB memory of other apparatus is attached, please attach a proper USB memory and turn on the power source again." via operation panel controlling section 107.

Step S203

The system managing section 203 instructs each section to stop operation. By this, the printer 201 remains stop as long as the power source is turned on again.

According to the above, in the embodiment 2, in the case that the printer 201 is attached to the improper memory and is turned on the power source, a function to stop the printer 201 is added. In the case that a desired USB memory 109 is attached, the printer 201 become a state to be able to operate, print data is always encrypted. By this, even if the HDD 114 is carried out and the stored print data leaks, the print data is all encrypted, therefore, as long as printer administrator has portable and proper USB memory, the decryption is difficult, so it is possible to prevent the information leakage.

The utilization possibility in industry:

In the embodiment 1 and the embodiment 2, only such case is explained that the present embodiment is applied to a printer. However, the present invention also can be applied to an image forming apparatus such as copying apparatus, facsimile and the like.

Moreover, the communication circuit in the embodiment 1 and the embodiment 2 can be applied to network, USB, IEEE1284 and serial interface.

Moreover, in the embodiment 1 and the embodiment 2, only such case is explained that the present embodiment is applied to a USB memory as a portable record medium. However, the present invention also can be formed by a compact flash memory, a microdrive, a mobile terminal and the like.

The present invention is not limited to the foregoing embodiments but many modifications and variations are possible within the spirit and scope of the appended claims of the invention.

What is claimed is:

1. An image forming apparatus, comprising:
a first encryption key storing section that is a nonvolatile memory to store a first encryption key, the first encryption key consisting of a part of an original encryption key for encrypting print information;
a second encryption key storing section that is an attachable and removable nonvolatile memory to store a second encryption key, the second encryption key consisting of the remainder of the original encryption key;
an encryption key generating section that reads the first and second encryption keys from the first and the second encryption key storing sections respectively, and generates the original encryption key from the first encryption key and the second encryption key, and stores the generated original encryption key into a volatile memory;
an encryption processing section that reads the generated original encryption key from the volatile memory, and encrypts the print information using the original encryption key, and stores the encrypted print information into a print information storing section;

a nonvolatile distinguishment information storing section that stores distinguishment information for distinguishing the image forming apparatus, wherein when the second encryption key storing section is attached, the encryption key generating section judges whether or not the first encryption key is stored in the first encryption key storing section, and:

(i) if it is judged that the first encryption key is not stored in the first encryption key storing section, the encryption key generating section obtains the original encryption key from the second encryption key storing section, generates the first and second encryption keys from the obtained original encryption key, stores the first encryption key into the first encryption key storing section, and stores the second encryption key along with the distinguishment information stored in the distinguishment information storing section into the second encryption key storing section, and (ii) if it is judged that the first encryption key is stored in the first encryption key storing section, the encryption key generating section reads the second encryption key and second distinguishment information from the attached second encryption key storing section, and if the second distinguishment information agrees with the distinguishment information stored in the distinguishment information storing section, the encryption key generating section generates the original encryption key from the read second encryption key and the first encryption key stored in the first encryption key storing section, and stores the generated original encryption key into the volatile memory.

2. The image forming apparatus according to claim 1, wherein the second encryption key storing section is a USB memory.

3. The image forming apparatus according to claim 1, further comprising:

a part encryption key generating section and an encryption key deleting section, wherein the second encryption key storing section previously stores the original encryption key;

the part encryption key generating section reads out the original encryption key from the second encryption key storing section, generates the first encryption key from the original encryption key, and stores the first encryption key into the first encryption key storing section; and generates the second encryption key from the original encryption key, and stores the second encryption key into the second encryption key storing section;

the encryption key deleting section, after the original encryption key is read out from the second encryption key storing section, deletes the encryption key from the second encryption key storing section.

4. The image forming apparatus according to claim 3, wherein the distinguishment information storing section is a first serial number storing section and the distinguishment information is a first serial number assigned to the image forming apparatus, the method further comprising:

wherein the nonvolatile distinguishment information storing section storing section has a second serial number storing section to store a second serial number assigned to the nonvolatile distinguishment information storing section;

the part encryption key generating section has a serial number writing section that makes the second encryption key storing section store the second encryption key, and writes information of the first serial number and the second serial number into the second encryption key storing section, the encryption key generating section, when judged that the first serial numbers in first serial number storing section and second encryption key storing section agree, and the second serial numbers in second serial number storing section and second encryption key storing section agree, generates and writes the encryption key into volatility memory; and when judged that they disagree, stops a generation of the original encryption key and performs a warning.

5. The image forming apparatus according to claim 1, wherein the second encryption key storing section previously stores the original encryption key, and if it is judged that the first encryption key is not stored in the first encryption key storing section, the encryption key generating section obtains the encryption key from the second encryption key storing section, and deletes the encryption key from the second encryption key storing section before storing the second encryption key and the distinguishment information into the second encryption key storing section.

6. The image forming apparatus according to claim 1 further comprising:

an operation compulsively-stopping section that instructs to stop operation of the image forming apparatus if distinguishment information read from the second encryption key storing section does not agree with distinguishment information stored in the distinguishment information storing section.

7. The image forming apparatus according to claim 6 wherein in the case that the operation is stopped by the operation compulsively-stopping section, the image forming apparatus remains stopped until a power source is turned on again.

\* \* \* \* \*